April 7, 1959  C. F. HENDEE ET AL  2,881,328
METHOD AND APPARATUS FOR DETECTING RADIATION
Filed April 16, 1954

INVENTORS.
CHARLES FRANKLIN HENDEE
SAMUEL FINE
BY
AGENT.

United States Patent Office 2,881,328
Patented Apr. 7, 1959

2,881,328

METHOD AND APPARATUS FOR DETECTING RADIATION

Charles Franklin Hendee, Irvington, and Samuel Fine, New York, N.Y., assignors, by mesne assignments, to North American Philips Company, Inc., New York, N.Y., a corporation of Delaware Application April 16, 1954, Serial No. 423,656

9 Claims. (Cl. 250—83.6)

This invention relates to apparatus and methods for detecting radiation, and particularly to such apparatus and methods which employ signals generated by radiation detector tubes or devices such as proportional counters, Geiger counters, scintillation counters, or the like.

Radiation detector tubes produce electrical output pulses or signals in accordance with, or in response to, radiation which impinges thereon. For a given type and magnitude of radiation, certain detector tubes will produce aperiodic output pulses, in the form of "main" pulses and "escape" pulses. The main output pulses represent the energy level or magnitude of the type of radiation being detected. It is a characteristic of certain detector tubes that there frequently occurs, in lieu of a main pulse, an "escape" pulse. The escape pulse is accompanied by an escape or release of radiation in the form of fluorescent photons, or X-rays or the like, from the gas in the detector tube. The escape pulse has a voltage amplitude less than that of the main pulse.

Because two types of output pulses, viz., main pulses and escape pulses, are produced by certain detector tubes, it is often difficult or impossible to obtain accurate results or to distinguish between the types of pulses. These difficulties have been pointed out in detail by West et al., in the Philosophical Magazine, ser. 7, vol. XLIII, August 1952, at the bottom of page 881 and on page 882. Usually it is desired to make use of only the main pulses, and occasionally it is desired to make use of only the escape pulses.

An object of the present invention is to provide an improved radiation detector system.

Another object is to provide a radiation detector system which distinguishes between main pulses and escape pulses produced by the detector device.

A further object is to provide a radiation detector system which is more accurate and reliable than such systems heretofore.

Still other objects will be apparent.

The invention employs a plurality of radiation detector tubes. One of these tubes is employed as a "primary" detector and receives the radiation to be detected or measured. One or more other detector tubes, called "secondary" detectors, are positioned to receive and generate a signal in accordance with the "escape" radiation from the primary tube which occurs whenever an escape pulse is generated in the primary tube. No radiation is emitted by the primary tube when main pulses are generated therein. A coincidence or anti-coincidence mixer or comparator circuit is provided to receive and compare the signals generated by the primary and secondary detector tubes. If a coincidence circuit is employed, then only the escape pulses from the primary tube will appear at the output of the coincidence circuit. If an anti-coincidence circuit is employed, then only the main pulses from the primary tube will appear at the output of the anti-coincidence circuit. Since only one type of pulses, viz., either main pulses or escape pulses, is produced by a radiation detector system in accordance with the invention, accurate and reliable measurements and other results may be obtained.

Referring to the drawing.

Figure 1:
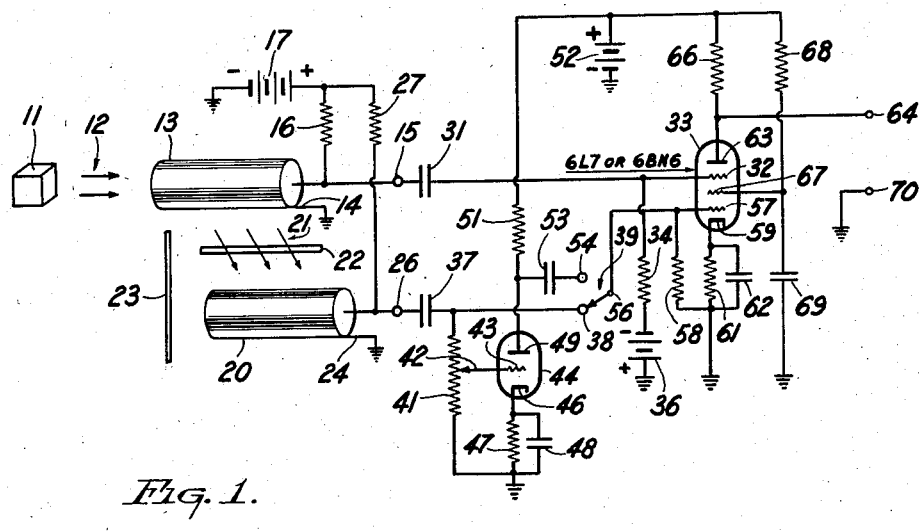
Fig. 1 shows a preferred embodiment of the invention, including an arrangement of radiation detectors and a schematic electrical diagram of a preferred signal comparing circuit.

Referring to Fig. 1, a source 11 of primary radiation 12 is positioned so that the radiation 12 will impinge upon and be detected by a primary radiation detector tube 13. The radiation 12 may comprise electromagnetic radiation, or radiation in the form of energetic particles, or the like. The detector tube 13, in its more usual form, comprises an outer cylindrical conductor electrode and an inner rod-like conductor electrode, these electrodes being in a gas-filled enclosure. Both electrodes may be enclosed in a glass or other envelope, or the outer electrode may be the envelope. The envelope is, of course, capable of transmitting the radiation. One of the electrodes, such as the outer cylindrical electrode, is connected to electrical ground as indicated at 14. The remaining electrode, for instance the inner rod, is connected to a terminal 15 and through a load resistor 16 to a terminal of a source 17 of voltage, the remaining terminal of which is connected to electrical ground. Alternatively, the detector tube 13 may be a scintillation counter.

A secondary radiation detector tube 20 is positioned with respect to the primary detector tube 13 so as to receive and be activated by the escape energy 21 from the primary tube 13. The tube 20 may be similar to the primary tube 13. A filter 22 may be positioned between the primary tube 13 and secondary tube 20, to control or select the particular type of escape energy which reaches the secondary tube 20. The filter 22 also may prevent scattered radiation 12 from reaching the secondary tube 20. A shield or barrier 23 is positioned between the secondary tube 20 and the radiation source 11, in order to shield the tube 20 from the direct radiation 12.

One of the electrodes of the tube 20, such as the outer cylinder, is connected to electrical ground as indicated at 24. The remaining electrode of the tube 20, such as the inner rod, is connected to a terminal 26 and through a load resistor 27 to a voltage source, which may be the voltage source 17.

The terminals 15 and 26 are connected to a signal utilization or comparing circuit or device comprising, preferably, a coincidence or anti-coincidence circuit which functons to compare and cancel out the undesired signals and pass through only the desired signals. By way of example, Fig. 1 shows, schematically, a utilization circuit which selectively acts as either a coincidence or anti-coincidence circuit. The terminal 15, which is the output terminal of the primary detector tube 13, is connected through an isolation condenser 31 to a control element or grid 32 of a multi-grid electronic tube or device 33. The grid 32 is connected through a resistor 34 to a terminal of a source 36 of bias voltage, the remaining terminal of which is connected to electrical ground.

The terminal 26, which is the output terminal of the secondary detector tube 20, is connected through an isolating condenser 37 to the "coincidence" terminal 38 of a selector switch 39. A potentiometer gain control 41 is connected between the switch terminal 38 and electrical ground, and adjustable tap 42 thereon being connected to a control grid or electrode 43 of a phase-inverting amplifier tube 44. A cathode 46 in the tube 44 is connected to electrical ground through a bias resistor 47 and by-pass condenser 48. An output electrode or anode 49 is connected through a load resistor 51 to a terminal 5 of a voltage source 52, the remaining terminal of which is grounded. The anode 49 also is connected through an isolation condenser 53 to an "anti-coincidence" terminal 54 at the switch 39.

A common terminal 56 of the single-pole double-throw selector switch 39 is connected to a second control grid 57 in the tube 33, and also is connected to electrical ground through a resistor 58. A cathode 59 in the tube 33 is connected to electrical ground through a bias resistor 61 and by-pass condenser 62. An output electrode or anode 63 in the tube 33 is connected to an output terminal 64 and also is connected through a load resistor 66 to the voltage source 52. A screen grid 67 in the tube 33 is connected to the voltage source 52 through a resistor 68. A by-pass condenser 69 is connected between the screen grid 67 and electrical ground. A second output terminal 70 is connected to electrical ground, the terminals 64 and 70 thus forming a pair of output terminals for the system.

Figure 2:
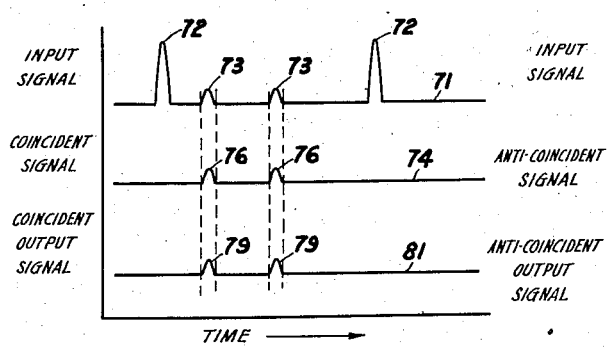
Fig. 2 is a graphical representation of electrical signals in the coincidence circuit.

When the invention is used to remove the main signals and allow only the escape signals of the detector tube 13 to appear at the output terminals 64, 70, the electric circuit portion of Fig. 1 is used as a coincidence circuit, and the switch 39 is adjusted so that the common terminal 56 makes electrical connection with the terminal 38, as shown. Fig. 2 shows the electric signals involved. The input signal 71, which is generated by the primary tube 13 in response to radiation 12, and which appears at the primary tube output terminal 15, comprises main pulses 72 and escape pulses 73.

The escape energy 21 which is emitted from the primary tube 13, activates the secondary tube 20 so that a secondary signal 74 is produced by the tube 20, this signal appearing at the secondary tube output terminal 26, and comprising pulses 76 in synchronism with the respective escape pulses 73. The individual secondary pulses 76 will be either main pulses or escape pulses having sufficient magnitude to activate the comparator circuit.

The main and escape signals 72, 73 of the primary signal 21 are fed to the control grid 32 of the coincidence tube 33. The pulses 76 of the coincidence signal 74 are fed to the control grid 57 of the coincidence tube 33. The bias voltage sources 36, 61 are so adjusted that the tube 33 normally is at or beyond cut-off, and an output signal will occur at the anode 63 only when the control grids 32, 57 are simultaneously actuated by positive-polarity signals. Thus the main pulses 72, which are applied to only one of the control grids, will not appear at the anode 63 or output terminal 64. The escape pulses 73, however, since they appear at the grid 32 at the same time that the secondary pulses 76 of like polarity appear at the grid 57, will be amplified by the tube 33 and will appear as pulses 79 in the output signal 81 at the output terminal 64.

Figure 3:
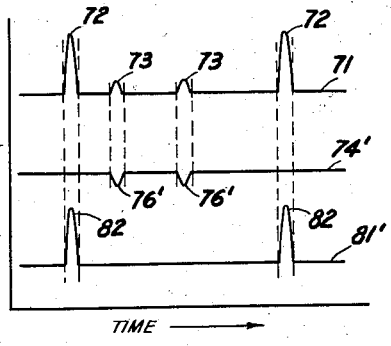
Fig. 3 is a graphical representation of electrical signals in the anti-coincidence circuit.

When the system is used for deriving anti-coincidence signals, the common terminal 56 of the switch 39 is connected electrically to the "anti-coincidence" switch terminal 54, whereby the secondary signals from the secondary tube 20 are fed through the phase-inverting amplifier tube 44 to the control grid 57 of the tube 33. In Fig. 3, the input signal 71 is the same as the input signal 71 shown in Fig. 2, and comprises main pulses 72 and escape pulses 83. The anti-coincidence signal 74' is similar to the coincidence signal 74 shown in Fig. 2, except that it is reversed in polarity or phase, the secondary pulses 76' having negative polarity. The bias voltage sources 36, 61 are so adjusted that the tube 33 normally will allow signals to pass through the output terminal 64. However, when signals of opposite polarity and proper magnitudes are simultaneously fed to the control grids 32 and 57, a cancellation occurs. Thus the anti-coincidence output signal 81', which appears across the output terminals 64, 70, will comprise output pulses 82 corresponding to the main pulses 72 of the input signal 71.

The primary escape pulses 73 become canceled out by the anti-coincident action of the tube 33, because the secondary pulses 76' are fed to the control grid 57 coincidently with the occurrence of the primary escape pulses 73 at the control grid 32. The relative amplitudes of the primary escape pulses 73 and the secondary pulses 76' may be adjusted by the gain control potentiometer 41 so as to obtain proper cancelling of these signals in the tube 33.

Figure 4:
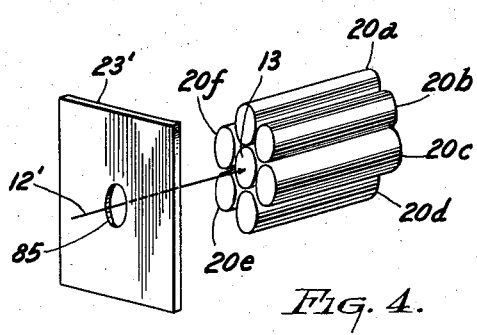
Fig. 4 shows an alternative arrangement of radiation detector tubes.

In the arrangement of radiation detector tubes shown in Fig. 4, the primary radiation detector tube 13 is surrounded by a plurality of secondary radiation detector tubes 20a, 20b, 20c, 20d, 20e and 20f, so that substantially all of the escape radiation energy from the primary tube 13, whatever its directions may be, will be picked up by the secondary detector tubes. This arrangement provides a more efficient system. If desired, various types of radiation filters may be positioned between the primary tube 13 and the respective secondary radiation tubes 20a–20f. The output terminals of the secondary detector tubes 20a–20f preferably are connected in parallel between electrical ground and the secondary input terminal 26 shown in Fig. 1. However, if desired, the output terminals of the secondary detector tubes 20a–20f may be connected to different sorts of utilization circuits. The mask 23' is provided with an opening 85 through which radiation 12' reaches the primary tube 13.

While preferred embodiments of the invention have been shown and described, various modifications thereof will be apparent to those skilled in the art. The scope of the invention is defined in the following claims:

What is claimed is:

1. A radiation detector system comprising a source of radiation, a first radiation detector device for producing an output signal in response to said radiation and positioned in the field of radiation of said source and having a signal output terminal, said device having a gas filling and being adapted to produce said output signal in the form of pulses at said output terminal, said device having the further characteristic of generating and emitting escape radiation in the form of bursts of fluorescent X-radiation which are generated in said gas filling, each of said bursts of radiation being accompanied by a pulse at said output terminal which is different from said first-named output signal pulses, a second radiation detector device for producing an output signal in response to said escape radiation and positioned in the field of said escape radiation and having a signal output terminal, and a signal comparing device connected to said signal output terminals.

2. The system in accordance with claim 1, in which said signal comparing device comprises a coincidence circuit.

3. The system in accordance with claim 1, in which said signal comparing device comprises an anti-coincidence circuit.

4. The system in accordance with claim 1, including a selective radiation filter for selectively passing said fluorescent X-radiation and positioned between said radiation detector devices.

5. The system in accordance with claim 1, including a radiation shield positioned between said source of radiation and said second radiation detector device.

6. A radiation detector system comprising a source of radiation, a first gas-filled radiation detector tube for producing an output signal in response to said radiation and positioned in the field of radiation of said source and having a pair of signal output terminals, said output signal being in the form of pulses at said output terminals, said tube having the further characteristic of generating and emitting escape radiation in the form of bursts of fluorescent X-radiation which are generated in said gas filling, each of said bursts of radiation being accompanied by a pulse at said output terminals which is different from said first-named output signal pulses, a source of operating voltage connected across said terminals, a second gas-filled radiation detector tube for producing an output signal in response to said escape radiation and positioned in the field of said escape radiation and having a pair of signal output terminals, a source of operating voltage connected across said last-named terminals, and a signal comparing device connected to said pairs of terminals.

7. A method of detecting radiation, comprising the steps of generating main pulses and generating simultaneous escape pulses and escape radiation in a first radiation detector device, said escape pulses being different from said main pulses and said escape radiation being in the form of bursts of fluorescent X-radiation which are generated in a gas filling of said device, generating pulses in a second radiation detector device in response to said escape radiation, and comparing said last-named pulses with said escape pulses.

8. In a radiation detector system having a gas-filled signal-producing radiation detector device for producing pulses in response to radiation and which generates and emits radiation in the form of bursts of fluorescent X-radiation which are generated in said gas filling, each of said bursts of radiation being accompanied by an output pulse which is different from said first-named pulses, said bursts of radiation being generated in response to detected radiation, a plurality of additional signal-producing radiation detector devices for producing output signals in response to said radiation emitted by said first-mentioned device and positioned to substantially surround said first-mentioned detector device and receive said radiation emitted therefrom, and means connected to compare the signals produced by said devices.

9. A radiation detector system comprising a gas-filled signal-producing radiation detector having the characteristic of generating and emitting radiation accompanied by an output signal pulse in addition to said signal, said generated radiation being in the form of bursts of fluorescent X-radiation which are generated in said gas filling, a second signal-producing radiation detector for producing an output signal in response to said radiation and positioned to detect said bursts of radiation, and means connected to compare the signals produced by said detectors.

References Cited in the file of this patent

UNITED STATES PATENTS

| | | |
|---|---|---|
| 2,316,361 | Piety | Apr. 13, 1943 |
| 2,349,753 | Pontecorvo | May 23, 1944 |
| 2,443,731 | Herzog et al. | June 22, 1948 |
| 2,563,333 | Herzog | Aug. 7, 1951 |
| 2,573,823 | Barghausen et al. | Nov. 6, 1951 |
| 2,706,793 | Alvarez et al. | Apr. 19, 1955 |

OTHER REFERENCES

Electron and Nuclear Counters, by S. A. Korff, copyright 1946, by D. Van Nostrand Co. Inc., pages 163–171.